W. L. McCORMICK.
PIPE COUPLING.
APPLICATION FILED NOV. 21, 1910.

1,030,107.

Patented June 18, 1912.

WITNESSES

INVENTOR
Warren L. McCormick
by W. M. Roach Jr.
his Attorney

UNITED STATES PATENT OFFICE.

WARREN L. McCORMICK, OF SAPULPA, OKLAHOMA.

PIPE-COUPLING.

1,030,107.

Specification of Letters Patent.   Patented June 18, 1912.

Application filed November 21, 1910.   Serial No. 593,491.

*To all whom it may concern:*

Be it known that I, WARREN L. MCCORMICK, a citizen of the United States, residing at Sapulpa, in the county of Creek and State of Oklahoma, have invented certain new and useful Improvements in Pipe-Couplings, of which the following is a specification.

This invention relates to certain new and useful improvements in the construction and operation of pipe-couplings and has for its object the construction of a coupling which will permit T and L joints to be uncoupled without disturbing the line of pipe or cutting the pipe as is now necessary.

Figure 1:
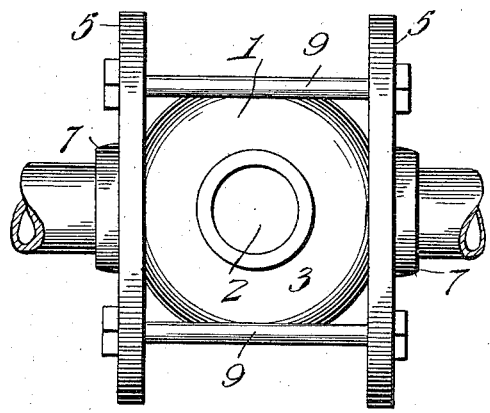
Figure 2:
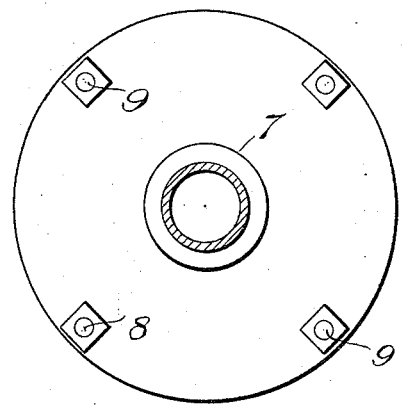
Figure 3:
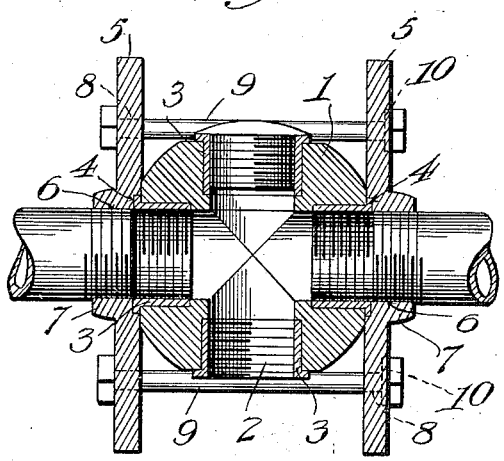
Figure 4:
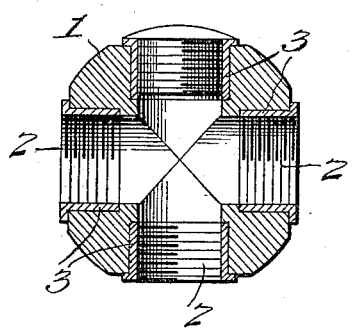

In the accompanying drawings Figure 1, is an elevation of my improved coupling showing a section of pipe in place in either flange. Fig. 2, is a front elevation of one of the flanges. Fig. 3, is a longitudinal central section of the complete coupling. Fig. 4, is a longitudinal central section of the ball.

Referring to said drawings by numerals; 1 represents a spherical member provided with suitable threaded openings 2, preferably three in number, communicating as shown in Fig. 3. Brass facings or bushings 3 are provided at each opening and likewise on the blank face. The object of the facing on the blank face being to provide a more secure joint when making an L joint. Brass facings 3 are adapted to be engaged by a counter-sunk portion 4 of the flanges 5 to form a more perfect seat or joint.

Flanges 5 are provided with a central opening 6 and a raised portion 7, surrounding said opening, said portion being interiorly threaded to receive the end of a pipe. Said flanges are further provided, near the outer edge thereof, with perforations 8, spaced 90 degrees apart, to receive bolts 9 for the purpose of binding said flanges to said ball 1. In one of said flanges a sunken portion 10 is provided to receive the heads of bolts 9 and hold the same against turning, thereby facilitating the tightening of said bolts.

In practice my invention is utilized as follows: When a T joint is desired the ball 1 is screwed on the end of the pipe forming the stem of the T, the opening opposite the blank face being utilized for this purpose, the flanges are then screwed on the ends of pipe forming the cross bar of the T, the bolts inserted and the flanges drawn snug to the facings of the other two openings. To make an L joint one of the oppositely disposed openings is plugged, the ball screwed on to one end of pipe, a flange screwed to the other end of pipe, the other flange placed in position on the blank face, the bolts inserted and the flanges drawn together.

Having described my invention, what I claim as new and desire to secure by Letters Patent is:

A pipe coupling comprising a spherical member provided with radial openings, bushings fitting said openings and having their outer ends provided with outturned annular flanges, flanges for engaging opposite sides of the spherical member and provided with central openings for the reception of pipe ends, said openings being surrounded by countersunk portions for the reception of the end flanges of the bushings, and means for clamping the oppositely disposed flanges to the spherical member.

In testimony whereof I hereunto affix my signature in presence of two witnesses.

WARREN L. McCORMICK.

Witnesses:
 JOHN E. BEIL,
 S. E. BAILEY.

Copies of this patent may be obtained for five cents each, by addressing the "Commissioner of Patents, Washington, D. C."